(12) United States Patent
Moradi-Araghi et al.

(10) Patent No.: US 11,466,198 B2
(45) Date of Patent: Oct. 11, 2022

(54) CROSSLINKING OF SWELLABLE POLYMER WITH PEI

(71) Applicants: CONOCOPHILLIPS COMPANY, Houston, TX (US); University of Kansas, Lawrence, KS (US)

(72) Inventors: Ahmad Moradi-Araghi, Bixby, OK (US); Min Cheng, Bartlesville, OK (US); Riley B. Needham, Bartlesville, OK (US); James H. Hedges, Bartlesville, OK (US); Ramesh S. Sarathi, Bartlesville, OK (US); Faye L. Scully, Bartlesville, OK (US); Terry M. Christian, Bartlesville, OK (US); Huili Guan, Lawrence, KS (US); Cory Berkland, Lawrence, KS (US); Jenn-Tai Liang, Lawrence, KS (US)

(73) Assignees: CONOCOPHILLIPS COMPANY, Houston, TX (US); UNIVERSITY OF KANSAS, Lawrence, KS (US)

( * ) Notice: Subject to any disclaimer, the term of this patent is extended or adjusted under 35 U.S.C. 154(b) by 131 days.

(21) Appl. No.: 16/694,004

(22) Filed: Nov. 25, 2019

(65) Prior Publication Data
US 2020/0095496 A1     Mar. 26, 2020

Related U.S. Application Data

(62) Division of application No. 15/145,842, filed on May 4, 2016, now abandoned, which is a division of
(Continued)

(51) Int. Cl.
*C09K 8/588* (2006.01)
*E21B 33/138* (2006.01)
*E21B 43/16* (2006.01)

(52) U.S. Cl.
CPC ............ *C09K 8/588* (2013.01); *E21B 33/138* (2013.01); *E21B 43/16* (2013.01)

(58) Field of Classification Search
CPC ........ C09K 8/588; E21B 33/138; E21B 43/16
See application file for complete search history.

(56) References Cited

U.S. PATENT DOCUMENTS

| 4,773,481 A | 9/1988 | Allison |
| 6,454,003 B1 | 9/2002 | Chang |
(Continued)

FOREIGN PATENT DOCUMENTS

| CA | 2761528 C | 6/2017 |
| CN | 102459364 A | 5/2012 |

OTHER PUBLICATIONS

Decision of the Patent Trial and Appeal Board for U.S. Appl. No. 15/145,842, Oct. 1, 2019, 13 pages (Year: 2019).*
(Continued)

*Primary Examiner* — Alicia Bland
(74) *Attorney, Agent, or Firm* — Boulware & Valoir (57) ABSTRACT

The invention is directed to stable and labile crosslinked water swellable polymeric microparticles that can be further gelled, methods for making same, and their various uses in the hygiene and medical arts, gel electrophoresis, packaging, agriculture, the cable industry, information technology, in the food industry, papermaking, use as flocculation aids, and the like. More particularly, the invention relates to a composition comprising expandable polymeric microparticles having labile crosslinkers and stable crosslinkers, said microparticle mixed with a fluid and an unreacted tertiary crosslinker comprising PEI or other polyamine based tertiary crosslinker that is capable of further crosslinking the microparticle on degradation of the labile crosslinker and swelling of the particle, so as to form a stable gel. A particularly important use is as an injection fluid in petro-
(Continued)

leum production, where the expandable polymeric microparticles are injected into a well and when the heat and/or pH of the well cause degradation of the labile crosslinker and when the microparticle expands, the tertiary crosslinker crosslinks the polymer to form a stable gel, thus diverting water to lower permeability regions and improving oil recovery.

6 Claims, 4 Drawing Sheets

Related U.S. Application Data application No. 14/087,440, filed on Nov. 22, 2013, now abandoned.

(60) Provisional application No. 61/729,682, filed on Nov. 26, 2012.

(56) References Cited

U.S. PATENT DOCUMENTS

| | | | |
|---|---|---|---|
| 6,729,402 B2 | 5/2004 | Chang | |
| 6,984,705 B2 | 1/2006 | Chang | |
| 2006/0278390 A1* | 12/2006 | Reddy | C09K 8/512 166/270 |
| 2008/0161208 A1* | 7/2008 | Beckman | C08L 101/14 507/211 |
| 2009/0264322 A1 | 10/2009 | Morris et al. | |
| 2010/0234252 A1 | 9/2010 | Moradi-Araghi | |
| 2010/0292109 A1 | 11/2010 | Moradi-Araghi | |
| 2010/0314114 A1 | 12/2010 | Moradi-Araghi | |
| 2010/0314115 A1 | 12/2010 | Moradi-Araghi | |
| 2011/0088902 A1* | 4/2011 | Harrison | C09K 8/512 166/300 |
| 2012/0132422 A1 | 5/2012 | Mirakyan et al. | |

OTHER PUBLICATIONS

Polymer Properties Database, Polyethyleneimine, 2 pages, printed Oct. 1, 2021 (Year: 2021).*

Vasquez et al., SPE139308, "Laboratory Development and Successful Field Application of a Conformance Polymer System for Low-, Medium- and High-Temperature Applications", 2010.

Al-Muntasheri, et al., SPE97530, "Investigation of A High Temperature Organic Water-Shutoff Gel: Reaction Mechanisms", 2005.

Ahmad Moradi-Araghi, A review of thermally stable gels for fluid diversion in petroleum production, Journal of Petroleum Science and Engineering, 26, 2000, 1-10.

Office Action from Chinese Patent Application for Invention No. 202010439591.8.

Al-Muntasheri, G. A.; Nasr-El-Din, H. A.; Al-Noaimi, K. R.; Zitha, P. L. J. "A study of polyacrylamide-based gels crosslinked with polyethyleneimine." Paper No. SPE 105925 presented at the International Symposium on Oilfiled Chemistry, Houston in 2007. [Manuscript published in 2008].

* cited by examiner

FIG. 1

Polymer in Section 1 has been washed out prior to the RRF test.

CROSSLINKING OF SWELLABLE POLYMER WITH PEI

CROSS-REFERENCE TO RELATED APPLICATIONS

This application is a Divisional Application of U.S. Ser. No. 15/145,842, filed May 4, 2016, which is a Divisional application of U.S. Ser. No. 14/087,440, filed Nov. 22, 2013, which claims priority to U.S. Ser. No. 61/729,682, filed Nov. 26, 2012. Each are expressly incorporated by reference herein it its entirety.

FEDERALLY SPONSORED RESEARCH STATEMENT

Not applicable.

REFERENCE TO MICROFICHE APPENDIX

Not applicable.

FIELD OF THE INVENTION

The invention relates to stable crosslinking of swellable polymers, methods for making same, and their various uses in the hygiene and medical arts, gel electrophoresis, packaging, agriculture, the cable industry, information technology, in the food industry, papermaking, use as flocculation aids, and the like. A particularly important use is as an injection fluid in petroleum production, especially in enhanced oil recovery (EOR) applications.

BACKGROUND OF THE INVENTION

Every day, oil and gas companies are challenged to produce as much of their oil reserves as possible. During the primary recovery stage, reservoir drive comes from a number of natural mechanisms. These include: natural water pushing oil into the well, expansion of the natural gas at the top of the reservoir, expansion of gas initially dissolved in the crude oil, and gravity drainage resulting from the movement of oil within the reservoir from the upper to the lower parts where the wells are located. Recovery factor during the primary recovery stage is typically 5-15%.

Over the lifetime of an oil well, however, the pressure will fall, and at some point there will be insufficient underground pressure to force the oil to the surface. After the natural reservoir drive diminishes, secondary and tertiary recovery methods are applied to further increase recovery.

Secondary recovery methods rely on the supply of external energy into the reservoir in the form of injecting fluids to increase reservoir pressure, hence replacing or increasing the natural reservoir drive with an artificial drive. Sometimes pumps, such as beam pumps and electrical submersible pumps (ESPs), are used to bring the oil to the surface. Other secondary recovery techniques increase the reservoir's pressure by water injection, natural gas reinjection and gas lift, which injects air, carbon dioxide or some other gas into the bottom of an active well, reducing the overall density of fluid in the wellbore.

The water injection method used in oil production is where water is injected into the reservoir for two reasons. First, the water provides pressure support of the reservoir (also known as voidage replacement). Second, the water functions to sweep or displace the oil from the reservoir, and push it towards oil production wells. Typical recovery factor from water-flood operations is about 30%, depending on the properties of oil and the characteristics of the reservoir rock. On average, the recovery factor after primary and secondary oil recovery operations is between 35 and 45%.

However, oil recovery is limited by the so-called "thief zones," whereby water (or other injected fluid) preferentially travels through the more porous regions of the reservoirs, thus bypassing less porous zones and leaving oil behind. One way to further improve oil recovery is to block the thief zones with a polymer or other material, thus forcing injected fluid through the less porous regions and causing a more effective sweep of the reservoir.

Gels are used for a variety of reasons in drilling and production applications. These fluids can be optimized for each reservoir by controlling the gelation process and are often used to block thief zones. U.S. Pat. No. 4,773,481, for example, describes the injection of a water soluble polymer, such as polyacrylamide, plus a gelling agent, such as PEI, into the thief zones, and thus plugging the thief zones.

U.S. Pat. No. 6,454,003 et seq, describes what might be called a "smart gel" since its properties change in response to particular stimuli. This patent describes an expandable crosslinked polymeric microparticle having an average particle diameter of about 0.05 to 10 microns. The particle is highly crosslinked with two crosslinkers—small amounts of one that is stable and a second that is labile and present in great excess. The excess crosslinking makes the initial particles quite small, allowing efficient propagation through the pores of a reservoir. On heating to reservoir temperature and/or at a predetermined pH or other stimuli, the reversible (labile) internal crosslinks break, allowing the particle to further expand by absorbing additional injection fluid, usually water. The unique properties of this particle allows it to fill the high permeability zones—commonly called thief zones or streaks—and then be expanded so that the swollen particle blocks the thief zones and subsequent injections of fluid are forced to enter the remainder of the reservoir, more effectively sweeping the reservoir.

One commercially available swellable polymer of this type is BrightWater®. Conventional partially hydrolyzed polyacrylamide, PHPAM, is quite viscous and requires a lot of horsepower for injection. Further, the viscous polymers often shear as they enter the formation. In contrast, the tiny BrightWater® microparticles can easily be injected without the need for high power pumps and the polymer thus avoids shear degradation during pumping. The BrightWater® microparticles also shows improved mobility control due to expansion ("popping") of the polymeric microparticles as a result of exposure to heat or varying pH values. However, the resulting "popped" polymers, which initially exhibit good resistance factors, appear to washout of the porous media with subsequent water injection. As a result, such treatments are short lasting and might not payoff the somewhat expensive treatment cost.

Figure 2:
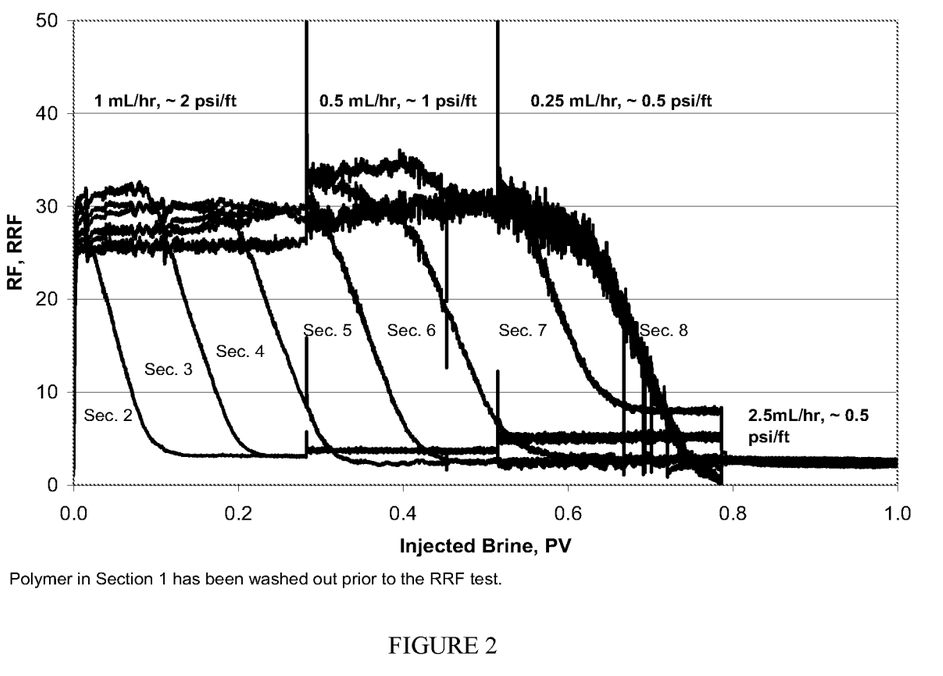
FIG. 2. Results of Slim Tube testing of the BrightWater® polymer.

FIG. 2 shows the results of a 40' long slim tube (eight 5' sections, i.d.=⅜") packed with 1.0 Darcy sand treated with 0.5% BrightWater® (NALCO CHEMICAL™, IL) in a field brine. Upon exposure to heat at 190° F., the microparticles started to open up due to hydrolysis of the labile crosslinker bonds. As this figure shows, the polymeric microparticles initially exhibit acceptable resistance factor (RF) in the range of 25 to 30 in this test. However, these values decrease with additional water injection, eventually resulting in very small residual resistance factors (RRF). FIG. 2 shows that the residual resistance factors for all eight sections of the slim tubes dropped substantially within one pore volume of brine injection. This and several other experiments performed in our laboratories confirm that the benefit of BrightWater® treatment is temporary.

The reason for the washout is not certain, but probably relates to several factors. First, most swellable polymers are also squeezable under pressure. Thus, when the reservoir pressure increases on further injection of fluid, the swollen particles wash out of the thief zone. Further, our own research suggests that the swollen polymer is not in gel form, thus, although viscous, is a liquid and can be washed out of the porous substrate.

What is needed in the art is a more stable "smart gel" that is gel stabilized and less susceptible to loss of fluid or polymer under the conditions of use. In particular, a swellable polymer that is resistant to wash out by subsequent fluid injections is needed in oil production, but the polymers will have utility in any application where stable swellable smart gels are desired.

The ConocoPhillips Company and The University of Kansas have already performed considerable research in the area of stabilizing these swellable polymers to washout. See e.g., US2010234252, US2010314115, US2010292109, and US2010314114.

However, further improvements could be made, in particular by making such products more effective, less expensive, and/or reducing environmental impact. For example, tertiary crosslinkers such as phenol-formaldehyde have been used with BrightWater-type swellable polymers, but they are toxic and have significant environmental impact.

SUMMARY OF THE INVENTION

The invention generally relates to smart gels that have stable and labile crosslinkers, allowing swelling in situ in response to a particular stimulus. Further, the swelled polymer is stabilized in situ by further crosslinking, thus forming a gel structure. In preferred embodiments, the amide groups of the fully hydrated acrylamide-based polymers are crosslinked with e.g., polyethyleneimine (PEI), to form a stable three dimensional gel network, very resistant to washout, and yet being more environmentally friendly than swellable polymers that were crosslinked in situ using phenol and formaldehyde. The PEI cross-linker has even been approved for food contact in the USA, confirming its low toxicity. Furthermore, the PEI tertiary crosslinker has applicability in high temperature reservoirs. Plus, since the crosslinking is covalent, it is more stable than ionic bonds.

PEI is well known to form thermally stable gels with acrylamide based polymers, such as copolymers of acrylamide and tert-butyl acrylate (PAtBA), copolymers of acrylamide and acryamido-2-methylpropane sulfonic acid (AMSA), copolymers of acrylamide and sodium 2-acryamido-2-methylpropane sulfonate (NaAMPS), copolymers of acrylamide, AMSPA, and N,N,-dimethyl acrylamide, as well as partially hydrolyzed polyacrylamide (PH-PAM).

These PEI crosslinked gel systems have been extensively studied in porous media. The gelation time and strength of e.g., a PEI and polymer gel system can be controlled by adjusting the polymer concentration and molecular weight, the PEI concentration, the total dissolved solids and salinity. The polymer concentration and molecular weight affects not only the gelation time and the gel strength, but also its stability. Among these factors the polymer concentration is the most important factor affecting gel strength. For the same polymer, adhesive force and final gel strength of the higher MW gels are superior to gels made with lower MW polymers at the same concentration. Further, the gelation time decreases and gelation strength weakens with increasing the salinity of gelling solution. Gelation time is largely dependent on temperature, but can be accelerated or retarded with additives. For all of these reasons, PEI was a good candidate for "popped" BrightWater® stabilization by gelation.

Laboratory experiments performed with swellable polymers of the BrightWater® type, but also containing 1000 ppm of PEI (2 kDa) resulted in the formation of a stable gel that could not be washed out from porous media, even with pressures of up to 1000 psi.

The polymer of the invention has particular use in enhanced oil recovery, as described above, and is preferably a hydrophilic polymer for this application. However, a stable polymer would find uses in all of the arts where swellable polymers are in current use and fluid loss is not desired, including as filler for diapers and other hygiene products, medical devices such as orthopedic insoles, ocular devices, and biomimetic implants, wipe and spill control agents, wire and cable water-blocking agents, ice shipping packs, controlled drug release, agricultural uses (e.g., soil additive to conserve water, plant root coating to increase water availability, and seed coating to increase germination rates), industrial thickeners, specialty packaging, tack reduction for natural rubber, fine coal dewatering, and the like.

Preferably, the stable smart gels of the invention comprise a highly crosslinked expandable polymeric particle having labile crosslinkers and stable crosslinkers, plus an unreacted tertiary PEI crosslinker that is added to the particles after they are made or after the labile crosslinker degrades or any time there in between.

In the example described below the tertiary crosslinker is injected after swelling of the polymer, but it can also be combined with the unexpanded kernel in the initial injection fluid, and if necessary for the application, the rate of gelation can be delayed by means known in the art in order to allow the particle to fully swell before completing gelation. Furthermore, the dry microparticle powders can be intimately mixed with unreacted tertiary crosslinker powders, and thus sold as a mixed powder that can be combined with fluid and other additives onsite.

A "stable crosslinker" is defined herein to be any crosslinker that is not degraded under the stimulus that causes the labile crosslinker to disintegrate. Representative non-labile crosslinking monomers include methylene bisacrylamide, diallylamine, triallylamine, divinyl sulfone, diethyleneglycol diallyl ether, and the like and combinations thereof. A preferred non-labile crosslinking monomer is methylene bisacrylamide.

The "labile crosslinker" is defined herein to be any crosslinker that decays or is reversible on application of a particular stimulus, such as irradiation, pH, temperature, etc. and combinations thereof. Representative labile crosslinkers include diacrylamides and methacrylamides of diamines such as the diacrylamide of piperazine, acrylate or methacrylate esters of di, tri, tetra hydroxy compounds including ethyleneglycol diacrylate, polyethyleneglycol diacrylate, trimethylopropane trimethacrylate, ethoxylated trimethylol triacrylate, ethoxylated pentaerythritol tetracrylate, and the like; divinyl or diallyl compounds separated by an azo such as the diallylamide of 2,2'-Azobis(isbutyric acid) and the vinyl or allyl esters of di or tri functional acids, and combinations thereof. Preferred labile cross linking monomers include water soluble diacrylates such as PEG 200 diacrylate and PEG 400 diacrylate and polyfunctional vinyl derivatives of a polyalcohol such as ethoxylated (9-20) trimethylol triacrylate and polymethyleneglycol diacrylate.

Combinations of multiple stable and labile crosslinkers can also be employed advantageously. Reaction to stimuli can also be controlled by labile crosslinker selection, as needed for particular reservoir conditions or for the application at issue. For example, judicious selection of labile crosslinkers—one that degrades at a very high temperature and another at a lower temperature—can affect the temperature and pH at which the kernel pops.

The preferred "tertiary crosslinker" used herein is PEI, because PEI is readily available, cost effective, the gels produced by this crosslinker are stable, yet provide less environmental impact than prior art tertiary crosslinkers. Further, PEI crosslinked gels have been tested under reservoir conditions, and are known to provide a stable 3D gel structure for extended periods of time, thus providing effective water shut-off at elevated reservoir temperatures. Additionally, the PEI crosslinked gels have longer gelation time than that of commonly used chromium(III) acetate crosslinking HPAM gel systems at 40° C., thus allowing them to penetrate deeper into the reservoir before gelling.

Figure 1:
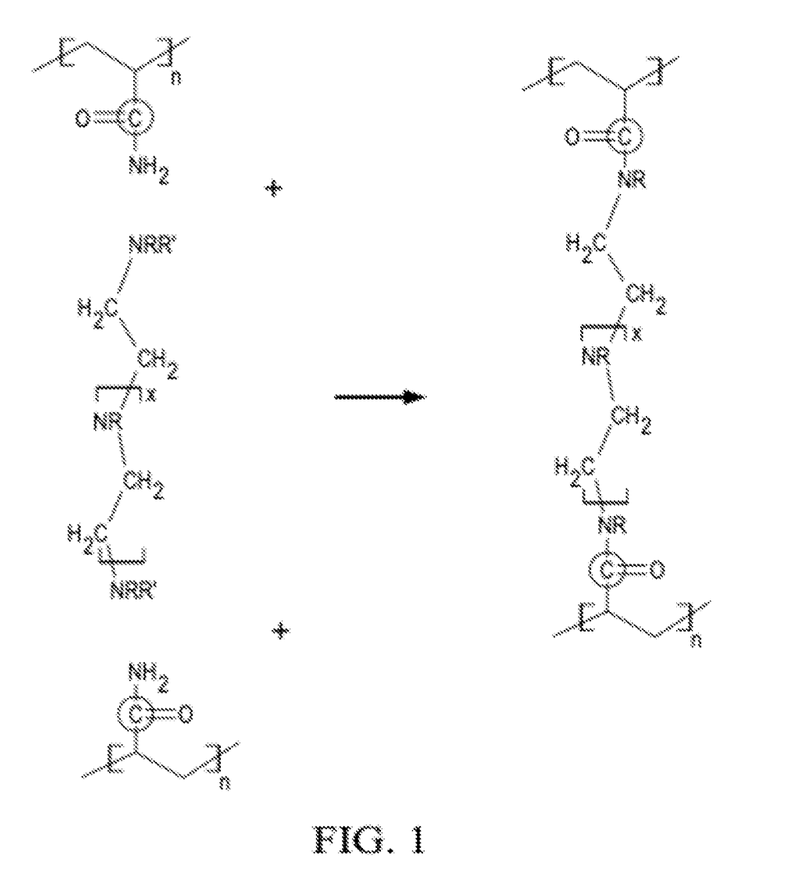
FIG. 1. Transamidation of the amide group.

The gelation mechanism is believed to be a transamidation mechanism, as shown in FIG. 1. FIG. 1 shows transamidation mechanism suggested in published literature (SPE 97530). As this reaction scheme shows, two amide groups from the acrylamide constituents of the popped Brightwater® polymer undergo transamidation reaction with two amine groups of PEI to create crosslink sites resulting in gels.

Although PEI is a preferred tertiary crosslinker, there are many similar amine-based crosslinkers that can serve the same function, having amine groups that can transamidate with amide groups in the polymer. Thus, tertiary crosslinkers can include polyalkyleneimine, a polyethyleneimine, a polyalkylenepolyamine, or simple polyamines such methylene diamine, ethylene diamine, hexamethylene diamine, hexamethylene triamine could also be used as tertiary crosslinkers.

When employed for enhanced oil recovery applications, the size range of the unexpanded particle will be selected to accord with the permeability characteristics of a given reservoir and increasing labile crosslinker provides smaller particles. Thus, the size is preferably about 0.05 to about 10 microns, or 1-3 microns, but the size can vary according to the needs of each application. Ranges as broad as 0.01 to about 100 microns, or sizes as high as 1000 microns can be acceptable. Further, in certain soil and spillage applications, the size can be up to a cm, though more preferably may be 1-5 mm. Generally speaking, the smaller particles will swell more quickly due to increased surface area to volume.

The proportion of stable to labile crosslinker can also vary depending on how much swelling on stimulus is required, but in the enhanced oil recovery applications a great deal of swelling is desired to effectively block the thief zones and increase the mobilization and/or recovery rate of hydrocarbon fluids present in the formations. Thus, the labile crosslinker greatly exceeds the stable crosslinker.

To obtain sizes in the range of about 0.05 to about 10 microns suitable for injection fluid use the labile crosslinker content is about 9,000-250,000 ppm or 10,000-200,000 ppm or 20,000-60,000 ppm. The smaller the particle desired, the more labile crosslinker used. If bigger particles are acceptable, less labile crosslinker can be used.

The amount of stable crosslinkers is from 1-1000 ppm or 100-500 ppm or about 300 ppm, but again this can vary based on the needs of the application.

The amount of unreacted tertiary crosslinker is in the range of 100-5,000 ppm, preferably about 200-2000, or more preferred about 200-1500 ppm, again depending on the application, the more rigid gels requiring increased concentrations. However, too much tertiary crosslinker concentration can cause excessive cross-linking and lead to gel syneresis (expulsion of water from gel structure due to over crosslinking), especially in brines with high $Ca^{2+}$ and/or $Mg^{2+}$ content.

The polymeric particles can be prepared from any suitable monomers, including nonionic monomers, cationic monomers, anionic monomers, and betaine monomers, provided at least one of the components therein provides the necessary group(s) for transamidation or PEI crosslinking to occur.

Representative nonionic monomers include N-isopropylacrylamide, N,N-dimethylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), maleic anhydride, N-vinyl pyrrolidone, vinyl acetate and N-vinyl formamide. Preferred nonionic monomers include acrylamide, N-methylacrylamide, N,N-dimethylacrylamide and methacrylamide. Acrylamide is more preferred.

Representative anionic monomers that can be used include acrylic acid, methacrylic acid, maleic acid, itaconic acid, 2-propenoic acid, 2-methyl-2-propenoic acid, 2-acrylamido-2-methyl propane sulfonic acid, sulfopropyl acrylic acid and other water-soluble forms of these or other polymerizable carboxylic or sulphonic acids, sulphomethylated acrylamide, allyl sulphonic acid, vinyl sulphonic acid, and the like. Preferred anionic monomers include 2-acrylamido-2-methyl propanesulfonic acid sodium salt, vinyl sulfonic acid sodium salt and styrene sulfonic acid sodium salt. 2-Acrylamido-2-methyl propanesulfonic acid sodium salt is more preferred.

Representative cationic monomers include the quaternary or acid salts of dialkylaminoalkyl acrylates and methacrylates such as dimethylaminoethylacrylate methyl chloride quaternary salt (DMAEA.MCQ), dimethylaminoethylmethacrylate methyl chloride quaternary salt (DMAEM.MCQ), dimethylaminoethylacrylate hydrochloric acid salt, dimethylaminoethylacrylate sulfuric acid salt, dimethylaminoethyl acrylate benzyl chloride quaternary salt (DMAEA.BCQ) and dimethylaminoethylacrylate methyl sulfate quaternary salt; the quaternary or acid salts of dialkylaminoalkylacrylamides and methacrylamides such as dimethylaminopropyl acrylamide hydrochloric acid salt, dimethylaminopropyl acrylamide sulfuric acid salt, dimethylaminopropyl methacrylamide hydrochloric acid salt and dimethylaminopropyl methacrylamide sulfuric acid salt, methacrylamidopropyl trimethyl ammonium chloride and acrylamidopropyl trimethyl ammonium chloride; and N,N-diallyldialkyl ammonium halides such as diallyldimethyl ammonium chloride (DADMAC). Preferred cationic monomers include dimethylaminoethylacrylate methyl chloride quaternary salt, dimethylaminoethylmethacrylate methyl chloride quaternary salt and diallyldimethyl ammonium chloride. Diallyldimethyl ammonium chloride is more preferred.

Representative betaine monomers (a net neutral mix of cationic and anionic monomers) include N,N-dimethyl-N-acryloyloxyethyl-N-(3-sulfopropyl)-ammonium betaine, N,N-dimethyl-N-methacryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(2-carboxymethyl)-ammonium betaine, N,N-dimethyl-N-acryloxyethyl-N-(3-sulfopropyl)- ammonium betaine, N,N-dimethyl-N-acrylamidopropyl-N-(2-carboxymethyl)-ammonium betaine, N-3-sulfopropylvinylpyridine ammonium betaine, 2-(methylthio)ethyl methacryloyl-S-(sulfopropyl)-sulfonium betaine, 1-(3-sulfopropyl)-2-vinylpyridinium betaine, N-(4-sulfobutyl)-N-methyldiallylamine ammonium betaine (MDABS), N,N-diallyl-N-methyl-N-(2-sulfoethyl) ammonium betaine, and the like. A preferred betaine monomer is N,N-dimethyl-N-methacryloyloxyethyl-N-(3-sulfopropyl)-ammonium betaine.

Representative swellable polymers also include polymers and copolymers of acrylamide. For example, copolymers of acrylamide and 2-acrylamido-2-methyl propane sulfonic acid, copolymers of acrylamide and 2-acrylamido-2-methyl propane sulfonic acid sodium, potassium or ammonium salts, copolymers of acrylamide and sodium acrylate, terpolymers of acrylamide, 2-acrylamido-2-methyl propane sulfonic acid and sodium acrylate.

The kernels can be prepared by methods known in the art, including the inverse emulsion polymerization technique described in U.S. Pat. Nos. 6,454,003, 6,729,402 and 6,984,705.

Kernel suspensions are prepared by mixing the tertiary crosslinker with the kernels and injection fluid, although as noted above, the tertiary crosslinker can be provided in an intimate mixture of crosslinker and microparticles, in which case, only fluid need be added.

In addition to the monomers that make up the polymeric kernel and three types of crosslinkers (two of which form the kernel polymer and one of which is unreacted until placed in situ), the aqueous solution may also contain other conventional additives including chelating agents to remove polymerization inhibitors, pH adjusters, initiators and other conventional additives, accelerators, retardants, as appropriate for the particular application. In addition, chemicals can be added that will reduce the adsorption of gelation chemicals to the oil reservoir.

The rate of gelation with the unreacted tertiary crosslinker can be controlled, as is known in the art. For example, SPE139308 describes a water-soluble carbonate retarder (0-10%), that has been added to a PEI crosslinking gel to delay the in situ cross linking time and allow reasonable placement times in reservoirs up to 350° F. Such retarders include sodium carbonate, sodium bicarbonate, lithium carbonate, lithium bicarbonate, potassium carbonate, potassium bicarbonate, ammonium carbonate, or ammonium bicarbonate. Additionally, temperature and pH can also affect the rate of gelation, as needed for a particular application. In addition, the gels can be destroyed with the use of strong oxidizing agents such as sodium hypochlorite.

In various embodiments, the invention can comprise one or more of the following:

A composition comprising expandable acrylamide-based polymeric particles having labile crosslinkers and stable crosslinkers, said particles combined with a fluid and an unreacted tertiary crosslinker comprising polyethyleneimine ("PEI") that is capable of further crosslinking the particles on degradation of the labile crosslinker so as to form a stable gel.

Preferably, the particles have acrylamide therein, or at least amide groups that can be transamidated. Particularly preferred particles comprise polyacrylamide, or partially hydrolyzed polyacrylamide, copolymer of acrylamide and sodium 2-acrylamido-2-methylpropane sulfonate. Preferably, the stable crosslinker is methylene bisacrylamide and the labile crosslinker is a diacrylate, or polyethylene glycol diacrylate.

In another embodiment, the invention is a composition comprising highly cross linked expandable hydrophilic polymeric microparticles having an unexpanded volume average particle size diameter of about 0.05-10 microns and a cross linking agent content of about 100,000-250,000 ppm of labile crosslinkers and about 1-500 ppm of stable cross linkers, combined with about 200-2000 ppm of unreacted PEI and a fluid comprising water, wherein the particles and crosslinkers are as herein described.

In another embodiment, the invention is a composition comprising a highly crosslinked expandable hydrophilic polymeric microparticle, preferably about 0.05-10 microns, and said hydrophilic polymer having amine/amide groups. The hydrophilic polymer can have an internal (reacted) crosslinker content of 10,000-250,000 ppm of labile crosslinkers and 1-500 ppm of stable crosslinkers. This microparticle can be combined with a fluid and 200-2000 ppm of unreacted tertiary crosslinker that can further crosslink said hydrophilic polymer, wherein said tertiary crosslinker is selected from the group consisting of polyalkyleneimine, a polyethyleneimine, a polyalkylenepolyamine, PEI, simple polyamines, methylene diamine, ethylene diamine, hexamethylene diamine, and hexamethylene triamine. The tertiary crosslinker can be premixed with the microparticle, co-injected therewith, or the two can be injected separately.

Methods of increasing the recovery of hydrocarbon fluids in a subterranean formation are also provided, comprising injecting into the subterranean formation a mixture comprising water and the compositions herein described, aging said mixture until it gels, and then producing hydrocarbon from said subterranean formation. The tertiary crosslinker can be premixed with the microparticles, co-injected at the same time, or the two can be injected separately, as desired.

As used herein ppm refers to weight ratio in parts per million, based on total weight.

As used herein a microparticle is about 0.05-10 microns in average size.

As used herein, "polymers" includes homopolymers and heteropolymers.

DESCRIPTION OF EMBODIMENTS OF THE INVENTION

The invention provides a novel polymer that swells on a stimulus and is then additionally crosslinked in situ to form a gel. Such smart gels have particular utility in sweeping reservoirs, but many uses are possible.

Extensive experiments performed with an expandable polymer, as described in U.S. Pat. Nos. 6,454,003, 6,729,402 and 6,984,705, demonstrated that this polymer swells as a result of aging at elevated temperature or exposure to acidic or caustic conditions. The copolymer of acrylamide and sodium AMPS is crosslinked with two crosslinkers. The first crosslinker is a stable crosslinker such as methylene bis-acrylamide in the range of 1-300 ppm, while the second crosslinker is a labile (unstable) compound such as PEG-200, or PEG-400, a diacrylate crosslinker that breaks down when exposed to high temperatures or changes in pH. The resulting doubly-crosslinked polymer results in a small particle size, ranging at 0.05 to 10 microns.

Such small particle polymers exhibit very low viscosity when suspended in water, a desirable property that improves injectivity, for treating high permeability zones deep in oil bearing formations. These low viscosity (water-like) microparticle solutions are injected into the thief zones of the reservoirs with very little pressure requirement for penetration.

If the reservoir temperature is high enough, or another suitable stimulus is applied, the labile crosslinker undergoes hydrolysis and breaks down allowing the microparticle or "kernel" to expand or "pop," thus increasing the viscosity of the solution. The resulting "popped" polymer diverts the subsequent water injection away from the thief zones into lower permeability oil zones to produce additional oil.

Experiments performed with these micro-particles injected into 40' slim tubes packed with sand showed impressive resistance factors in all eight 5' sections of the slim tubes after aging at elevated temperatures (150-190° F.). However, our research also indicated that resistance to flow of water gradually diminished with additional water injection indicating polymer wash-out in porous media—a highly undesirable property. See e.g., FIG. 2.

We therefore undertook to prevent wash-out of expandable polymers, and discovered that when PEI was combined with the above swellable polymer, the resulting gel remained extremely stable to washout, even at high pressure!

The function of the PEI tertiary crosslinker in this application is not proven, but probably uses a mechanism similar to the following: The unswelled microparticles contain a copolymer of acrylamide and sodium AMPS, which is doubly crosslinked with methylene bis-acrylamide as a permanent crosslinker and PEG-200 or PEG-400 diacrylate, as a labile or unstable crosslinkers. These micro-particles are in a ball form and cannot be further crosslinked since the functional groups are mostly hidden inside these microparticles.

After the polymer reaches the target zone deep in the reservoir, the unstable internal crosslinkers PEG-200 or PEG-400 diacrylates hydrolyze, and the particle then opens up (swells or "pops"). Such popped particles behave as a typical polymer exhibiting good viscosities, but they are not gels. The addition of the tertiary PEI crosslinker, crosslinks the now accessible amide groups and results in a stable gel in situ.

Slim tube tests were performed to determine the performance of BrightWater® type polymers in porous media when crosslinked in situ with the PEI tertiary crosslinker. Each tube was composed of eight 5' long stainless steel tubing with internal diameter (i.d.)=⅜". The sections were filled with sand before connecting each to a pressure tap and assembling them together and forming a coil from them for ease of handling. The coil was then placed in an oven set to a desired temperature. Flow rates and differential pressure measurements were monitored by a LabVIEW data acquisition system throughout the experiment.

Each test required three Isco 500D syringe pumps. One pump was used to maintain a back pressure of 100 psi on the slim tube. The second pump was used for water injection, and the third pump was used for polymer injection. These pumps were programmed to inject or withdraw at a given flow rate while monitoring the pressure.

The test was initiated by water injection at constant flow rates to determine permeability in each section of the slim tube. About 1-2 pore volume (PV) polymer solution was then injected into the slim tube at constant flow rate followed by a small amount of water injection to clear the inlet lines from polymer. Simultaneously 6 ampoules containing the polymer solution were placed in the same oven to monitor the progress of popping process.

Popping time is a strong function of aging temperature—that is the higher the temperature, the shorter the popping time. In order to determine the optimum aging condition, we accelerated aging of the polymer at 190° F. to shorten the popping time. After varying aging times at 190° F. or 150° F., the resistance factor was determined by injecting a small amount of water. At the same time the content of one ampoule was used to determine the viscosity and extent of polymer popping.

The brine composition used in the experiments is given in Table A.

TABLE 1

| Brine A Composition | | |
|---|---|---|
| Bicarbonate | ppm | 1621 |
| Chloride | ppm | 15330 |
| Sulfate | ppm | 250 |
| Calcium | ppm | 121 |
| Potassium | ppm | 86.9 |
| Magnesium | ppm | 169 |
| Sodium | ppm | 11040 |
| Strontium | ppm | 7.57 |

Figure 3:
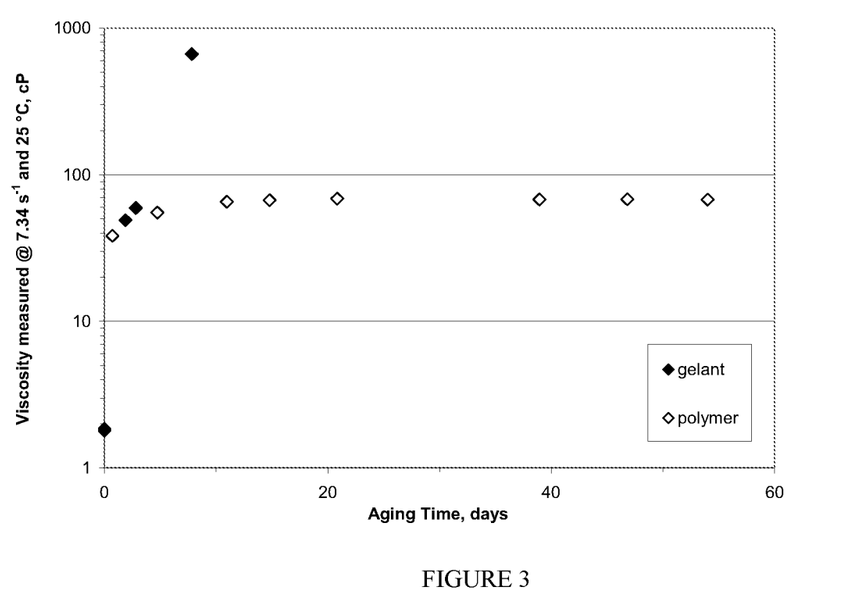
FIG. 3. Viscosity versus Aging Time for 0.5% BrightWater® EC 9408A with (black diamonds) or without (hollow diamonds) 1000 ppm PEI (25 KD), which was prepared in Brine A and aged at 190° F.

FIG. 3 shows the viscosity versus aging time for 0.5% BrightWater® EC 9408A microparticles with and without 1000 ppm PEI aged at 190° F. in brine A. As this graphic shows, the solution of polymer alone reached a maximum viscosity of about 67 centi Poise (cP) within 11 days of aging with no appreciable change with additional aging at 190° F. However, the same microparticles solution containing 1000 ppm PEI (identified as "gelant") began to gel within a few days of aging at 190° F.

Figure 4:
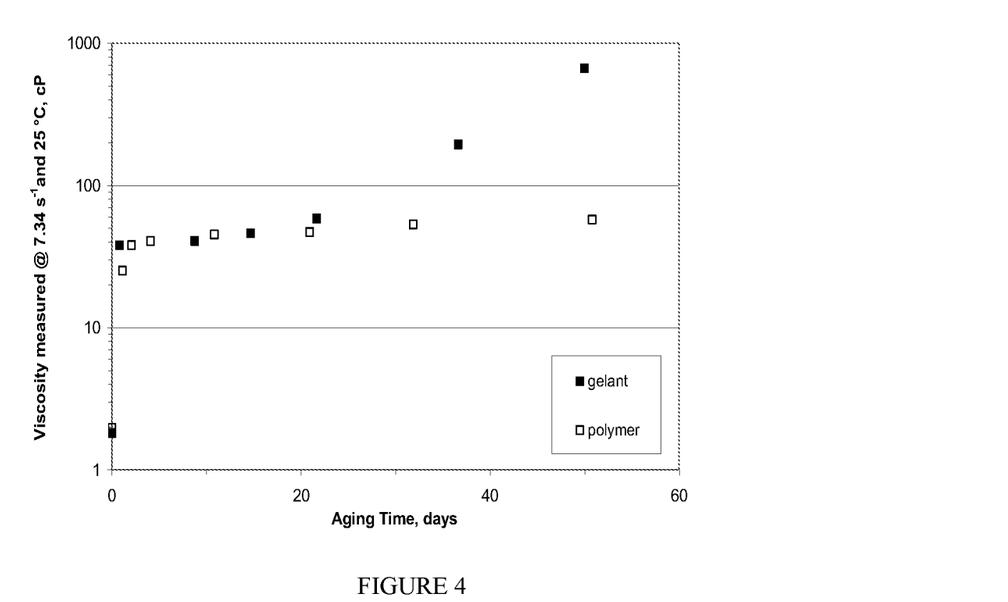
FIG. 4. Viscosity versus Aging Time for 0.5% BrightWater® EC 9408A with (black square) or without (hollow square) 1000 ppm PEI (25 KD), which was prepared in Brine A and aged at 150° F.

A similar experiment performed with this system aged at 150° F. resulted in gel formation at longer aging times. FIG. 4 shows a plot of viscosity versus aging time at 150° F. for a solution of 0.5% BrightWater® EC 9408A microparticles achieving a maximum viscosity of about 57 cP in 51 days of aging. A similar solution containing 0.5% BrightWater® EC 9408A and 1000 ppm PEI (identified as "gelant") began to gel in about 28 days of aging at 150° F.

Figure 5:
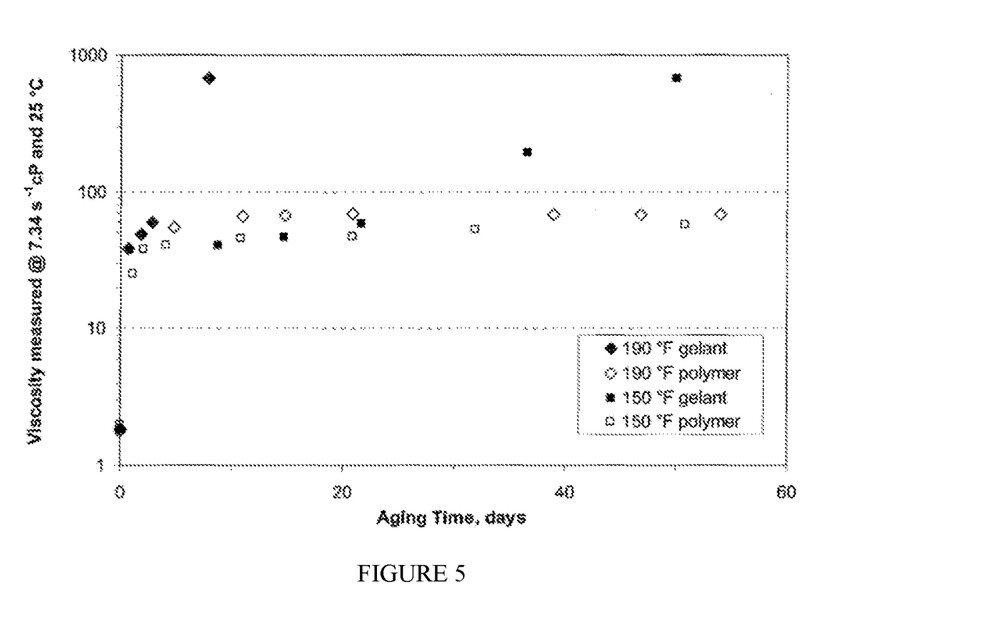
FIG. 5. Viscosity versus Aging Time for 0.5% BrightWater® EC 9408A with (black shapes) or without (hollow shapes) 1000 ppm PEI (25 KDa), which was prepared in Brine A and aged at 150° F. and 190° F.

FIG. 5 shows composite plots of FIGS. 3 and 4 indicating gel formation when the polymer contains PEI and aged at 150° F. or 190° F. The difference is the longer tertiary gelation time at the lower temperature. Gelation time can also be increased with the addition of a carbonate retarder.

Earlier experiments performed in a slim tube treated with BrightWater® microparticles and phenol/formaldehyde crosslinking systems also produced strong gels. The resulting gel effectively prohibited water flow in such tube even at pressures as high as 1000 psi. Such gels essentially consolidated the sand, which could not be pushed out of the tube unless it was cut in small segments (2-3") and exposed to very high pressures (~1000 psi). Our experiments herein with the PEI tertiary crosslinker also produced very strong gels, but differed in that PEI is less toxic to the environment. Further, PEI being a single component avoids any risk of separation, whereas phenol/formaldehyde might separate due to chromatographic separation.

Figure 6:
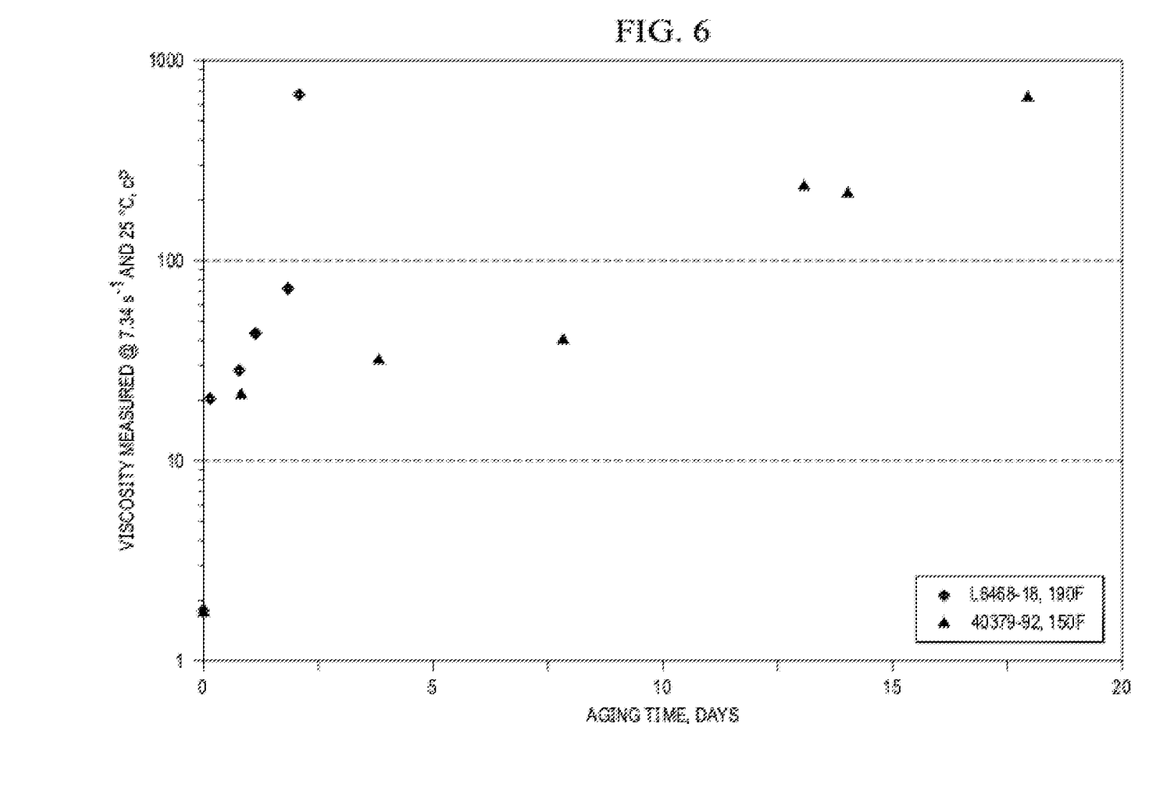
FIG. 6. Viscosity versus aging time for an anionic polymeric microparticle and 1000 ppm PEI prepared in synthetic Brine A and aged at 150° F. (triangles) and 190° F. (diamonds). The anionic polymeric microparticle is a swellable copolymer of acrylamide and sodium acrylate crosslinked with poly(ethylene glycol) (258) diacrylate and methylene bisacrylamide.

A final experiment is shown in FIG. 6, which compares viscosity versus aging time for an anionic polymeric microparticle that is a swellable copolymer of acrylamide and sodium acrylate crosslinked with poly(ethylene glycol) diacrylate and methylene bisacrylamide and including 1000 ppm PEI (MW 2000). The polymeric particles were aged in synthetic Brine A. As illustrated in FIG. 6, temperature affects gelation rate, increasing temperature increasing gelation rate.

In summary, addition of polyethyleneimine to BrightWater® or anionic polymeric microparticles result in gelation of the popped polymer, when exposed to stimulants such as heat or pH changes. This process is expected to improve the longevity of BrightWater® or other swellable microparticle treatments. While gelation of PHPAM or other acrylamide based polymers with polyethyleneimine is well known, gelation of swellable microparticles with PEI is a novel process with the distinct advantage of low injection viscosity and in situ formation of gels which increase the longevity of BrightWater® and similar treatments.

These experiments proved that the longevity of BrightWater® and similar polymer treatments could be significantly enhanced by addition of an external tertiary crosslinking system to the injection package. In these treatments, PEI tertiary crosslinking system produced gels with the popped polymer exhibiting very large RF values. The resulting gels are not mobile and cannot be washed out of the slim tube. Such gels actually behaved as binding agents consolidating the sand. Furthermore, the compositions described herein have many uses in other industries.

Each of the following references is incorporated herein in their entirety for all purposes.

U.S. Pat. No. 4,773,481
U.S. Pat. Nos. 6,454,003, 6,729,402, 6,984,705
US2010234252 Crosslinked Swellable Polymer
US2010314115 Swellable polymer with cationic sites
US2010292109 Swellable polymers with hydrophobic groups
US2010314114 Swellable polymer with anionic sites
SPE139308 Laboratory Development and Successful Field Application of a Conformance Polymer System for Low-, Medium- and High-Temperature Applications.
SPE97530 Investigation of—A High Temperature Organic Water-Shutoff Gel: Reaction Mechanisms

The invention claimed is:

1. A method of increasing the recovery of hydrocarbon fluids in a subterranean formation, comprising:
   a. injecting into the subterranean formation a mixture comprising a brine and expandable nonionic acrylamide-based polymeric microparticles having labile crosslinkers and stable crosslinkers, said labile crosslinkers are PEG-200 diacrylate or PEG-400 diacrylate, and said stable crosslinker is methylene bis-acrylamide, wherein the brine is:

| Brine Composition | |
|---|---|
| Bicarbonate | 1621 ppm |
| Chloride | 15330 ppm |
| Sulfate | 250 ppm |
| Calcium | 121 ppm |
| Potassium | 86.9 ppm |
| Magnesium | 169 ppm |
| Sodium | 11040 ppm |
| Strontium | 7.57 ppm | b. injecting an unreacted tertiary crosslinker into the subterranean formation that further crosslinks said expandable acrylamide-based polymeric microparticle by transamidation, wherein said tertiary crosslinker is 1000 ppm of polyethyleneimine ("PEI");
   c. aging said mixture at 190° C. until it forms a stable gel that can withstand pressure of up to 1000 psi; and,
   d. producing hydrocarbon from said subterranean formation.

2. The method of claim 1, wherein steps a) and b) occur at different times or the same time.

3. The method of claim 1, wherein said mixture further comprises a tertiary crosslinker retarder or a carbonate retarder.

4. The method of claim 1, wherein said nonionic acrylamide-based polymeric particles are polyacrylamide particles.

5. A method of increasing the recovery of hydrocarbon from a reservoir, comprising:
   a. obtaining a dry powder mixture comprising i) expandable microparticle kernels comprising nonionic acrylamide-based polymers crosslinked with labile crosslinkers and stable crosslinkers, plus ii) an unreacted tertiary crosslinker consisting of PEI;
   b. mixing said dry powder mixture with a fluid to form a kernel suspension;
   c. injecting said kernel suspension into a reservoir containing hydrocarbon;
   d. degrading the labile crosslinker and expanding said expandable microparticle kernels to form expanded polymer;
   e. covalently crosslinking said expanded polymer by transamidation with 1000 ppm PEI to form a stable gel having a viscosity of 700 centipoise that can withstand pressure of up to 1000 psi;
   f. injecting a fluid into said reservoir to sweep hydrocarbon towards a production well; and
   g. producing hydrocarbon from said production well.

6. The method of claim 5, wherein said nonionic acrylamide-based polymers are polyacrylamide.

* * * * *